US010914377B2

(12) United States Patent
Finke et al.

(10) Patent No.: US 10,914,377 B2
(45) Date of Patent: Feb. 9, 2021

(54) COUPLED PLANETARY GEARBOX

(71) Applicant: Hamilton Sundstrand Corporation, Charlotte, NC (US)

(72) Inventors: Aaron M. Finke, Janesville, WI (US); Stephen Michael Bortoli, Roscoe, IL (US); Mark J. Franklin, Janesville, WI (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 25 days.

(21) Appl. No.: 16/353,444

(22) Filed: Mar. 14, 2019

(65) Prior Publication Data
US 2020/0292074 A1    Sep. 17, 2020

(51) Int. Cl.
*F16H 63/30*        (2006.01)
*F16D 25/10*        (2006.01)
(Continued)

(52) U.S. Cl.
CPC ........... *F16H 63/3026* (2013.01); *F02C 7/32* (2013.01); *F16D 25/0638* (2013.01); *F16D 25/10* (2013.01); *F16H 3/66* (2013.01); *F05D 2260/40311* (2013.01); *F16H 2200/0043* (2013.01); *F16H 2200/2007* (2013.01); *F16H 2200/2035* (2013.01); *F16H 2200/2064* (2013.01); *F16H 2200/2094* (2013.01)

(58) Field of Classification Search
CPC ............... F16H 63/3026; F16H 3/66; F16H 2200/2064; F16H 2200/2007; F16H 2200/2094; F16H 2200/0043; F16H 2200/2035; F02C 7/32; F16D 25/10; F16D 25/0638; F05D 2260/40311
See application file for complete search history.

(56) References Cited

U.S. PATENT DOCUMENTS 3,969,957 A    7/1976  DeLalio
6,044,719 A    4/2000  Reed, Jr. et al.
(Continued)

FOREIGN PATENT DOCUMENTS

DE    102009020950 A1   5/2009
EP        2166245 B1    4/2012
(Continued)

OTHER PUBLICATIONS

EP Search Report; Application No. 19210211.9; dated Jun. 18, 2020; 8 pages.

*Primary Examiner* — Mark A Manley
(74) *Attorney, Agent, or Firm* — Cantor Colburn LLP

(57) ABSTRACT

Disclosed is a transmission having: an input shaft configured to rotationally communicate with a gas turbine engine; an output shaft configured to rotationally communicate with an aircraft accessory; and a gear system connected between the input shaft and the output shaft, the gear system including: a plurality of clutches that are axially aligned and radially offset, the plurality of clutches configured to engage in parallel the output shaft and shift the transmission to generate a plurality gear speeds; and a plurality of pistons that are configured to engage the respective plurality of clutches, the plurality of pistons being hydraulically controlled and adapted to receive fluid from a respective plurality of ports in the output shaft.

20 Claims, 13 Drawing Sheets

(51) Int. Cl.
*F16D 25/0638* (2006.01)
*F02C 7/32* (2006.01)
*F16H 3/66* (2006.01)

(56) References Cited

U.S. PATENT DOCUMENTS

| | | | |
|---|---|---|---|
| 8,123,014 B2 | 2/2012 | Wooden | |
| 8,534,074 B2 | 9/2013 | Copeland | |
| 2002/0183154 A1* | 12/2002 | Ziemer | F16H 3/663 |
| | | | 475/5 |
| 2012/0111022 A1* | 5/2012 | Dyer | F02C 7/277 |
| | | | 60/788 |
| 2012/0145511 A1* | 6/2012 | Wilton | F16D 25/0638 |
| | | | 192/85.17 |
| 2012/0216638 A1* | 8/2012 | Pritchard | F16H 3/006 |
| | | | 74/329 |
| 2015/0328976 A1 | 11/2015 | Wu et al. | |
| 2016/0047426 A1* | 2/2016 | Azumai | F16D 21/06 |
| | | | 192/48.601 |
| 2017/0321764 A1* | 11/2017 | Shimozawa | F16H 59/42 |
| 2017/0363010 A1* | 12/2017 | Rodriguez | F02C 7/277 |
| 2018/0058572 A1* | 3/2018 | Heuver | F16H 61/0204 |

FOREIGN PATENT DOCUMENTS

| | | |
|---|---|---|
| EP | 1959114 B1 | 5/2012 |
| FR | 1360218 A | 5/1964 |

\* cited by examiner

COUPLED PLANETARY GEARBOX

BACKGROUND

This application relates to a speed gearbox and more particularly to a coupled planetary gearbox driven for an aircraft system.

An increasing number of aircraft require significant electric power for operation. Various components may be driven by a high pressure spool through a power takeoff shaft. Due to modern aircraft engine efficiency requirements, electric power demand may be increasing beyond the power extraction potential of the engine high pressure spool.

BRIEF SUMMARY

Disclosed is a transmission comprising: an input shaft configured to rotationally communicate with a gas turbine engine; an output shaft configured to rotationally communicate with an aircraft accessory; and a gear system connected between the input shaft and the output shaft, the gear system including: a plurality of clutches that are axially aligned and radially offset, the plurality of clutches configured to engage in parallel the output shaft and shift the transmission to generate a plurality gear speeds; and a plurality of pistons that are configured to engage the respective plurality of clutches, the plurality of pistons being hydraulically controlled and adapted to receive fluid from a respective plurality of ports in the output shaft.

In addition to one or more of the above disclosed features or as an alternate, the plurality of pistons includes a first piston and a second piston and, wherein the plurality of ports in the output shaft include: a first port fluidly communicating fluid to the first piston, the first piston engaging the first clutch of the plurality of clutches; and a second port fluidly communicating fluid to a second piston of the plurality of pistons, the second port being axially aft of the first port, the second piston engaging the second clutch of the plurality of clutches.

In addition to one or more of the above disclosed features or as an alternate, the output shaft includes: a first output shaft segment that includes the plurality of fluid ports; a second output shaft segment that extends radially from the first output shaft segment, the second output shaft segment being axially between the plurality of ports; and a third output shaft segment that extends axially from the second output shaft segment a first cavity is formed by the first output shaft segment, the second output shaft segment and third output shaft segment; and a first piston housing is formed by an axial aft portion of the first cavity and a first clutch housing is formed by an axial forward portion of the first cavity;

In addition to one or more of the above disclosed features or as an alternate: the transmission includes a first intermediate output shaft and a second intermediate output shaft; the first clutch is configured to engage the output shaft and the first intermediate output shaft; and the second clutch is configured to engage the output shaft and the second intermediate output shaft.

In addition to one or more of the above disclosed features or as an alternate: the first clutch housing includes a first spline that is a radially inner spline and a second spline that is a radial outer spline; the first piston includes a third spline that is a radial outer spline configured to engage with the first spline; the second piston includes a fourth spline that is a radial inner spline configured to engage with the second spline.

In addition to one or more of the above disclosed features or as an alternate: the second intermediate output shaft includes a fifth spline that is a radially inner spline; and the second piston includes a sixth spline that is radially outer spline configured to engage with the fifth spline.

In addition to one or more of the above disclosed features or as an alternate: the first intermediate output shaft has a seventh spline that is a radially outer spline; and the first clutch includes: an eighth spline that is a radially inner spline configured to engage with the seventh spline; a ninth spline that is a radially outer spline configured to engage with the first spline; wherein: when the first clutch is engaged, the first intermediate output shaft and the output shaft are rotationally coupled; and when the first clutch is not engaged, the first intermediate output shaft and the output shaft are rotationally decoupled.

In addition to one or more of the above disclosed features or as an alternate: the second clutch includes: a tenth spline that is a radially inner spline configured to engage with the second spline; and an eleventh spline that is a radially outer spline configured to engage with the second intermediate output shaft; wherein: when the second clutch is engaged, the second intermediate output shaft and the output shaft are rotationally coupled; and when the second clutch is not engaged, the second intermediate output shaft and the output shaft are rotationally decoupled.

In addition to one or more of the above disclosed features or as an alternate: the first clutch comprises a first clutch pack comprising alternating clutch plates respectively comprising radially inner facing splines and radially outer facing splines; and the second clutch comprises a second clutch pack having alternating clutch plates respectively comprising radially inner facing splines and radially outer facing splines.

In addition to one or more of the above disclosed features or as an alternate: a first spring biases the first piston to disengage from the first clutch; and a second spring biases the second piston to engage the second clutch.

In addition to one or more of the above disclosed features or as an alternate: a first axially aft piston seal is disposed between the second output shaft segment and the first slider outer shaft; and a first axially forward piston seal is disposed between the first output shaft segment and the first slider inner shaft; a second axially aft piston seal is disposed between the first output shaft segment and the second slider inner shaft; and a second axially forward piston seal is disposed between the second output shaft segment and the second slider outer shaft.

Further disclosed is a method of transmitting rotational energy, comprising: providing a transmission that includes an input shaft, a plurality of pistons, a plurality of clutches and an output shaft, wherein the clutches are axially aligned and radially offset in the transmission; providing a driving force to the input shaft of the transmission; and controlling hydraulic fluid within the output shaft of the transmission to engage the plurality of pistons such that the plurality of pistons engage a respective one of the plurality of clutches such that the clutches engage in parallel the output shaft and shift the output shaft between a plurality or rotational speed.

In addition to one or more of the above disclosed features or as an alternate, the method includes: communicating fluid through a first port of the plurality of ports in the output shaft to a first piston of the plurality of pistons to engage and disengage with the first clutch; and communicating fluid through a second port of the plurality of ports in the output shaft to a second piston of the plurality of pistons to engage and disengage with the second clutch.

In addition to one or more of the above disclosed features or as an alternate, the method includes: engaging the first output shaft and a first intermediate output shaft of the transmission through the first clutch; and engaging the first output shaft and a second intermediate output shaft of the transmission through the second clutch.

In addition to one or more of the above disclosed features or as an alternate, the method includes: engaging a first spline in the output shaft and a second spline in the output shaft with a third spline in the first piston and a fourth spline in the second piston, thereby rotationally coupling the output shaft, the first piston and the second piston.

In addition to one or more of the above disclosed features or as an alternate, the method includes: engaging a fifth spline in the second intermediate output shaft with a sixth spline in the second piston, thereby rotationally coupling the second intermediate output shaft and the second piston.

In addition to one or more of the above disclosed features or as an alternate, the method includes: engaging a seventh spline in the first intermediate output shaft with an eighth spline in the first clutch; and engaging a ninth spline in the first clutch with the first spline; whereby engaging the first clutch rotationally couples the first intermediate output shaft and the output shaft.

In addition to one or more of the above disclosed features or as an alternate, the method includes: engaging a tenth spline in the second clutch with the second spline; and engaging an eleventh spline in the second clutch with the second intermediate output shaft; whereby engaging the second clutch rotationally couples the second intermediate output shaft and the output shaft.

In addition to one or more of the above disclosed features or as an alternate, the method includes: biasing the first piston with a first spring to normally disengage the first clutch; and biasing the second piston with a second spring to normally engage the second clutch.

In addition to one or more of the above disclosed features or as an alternate, the method includes: sealing fluid from flowing to the first piston from the first port with a first seal that is an axially forward seal located between the first piston and the output shaft and a second seal that is an axially aft seal located between the first piston and the output shaft; and sealing fluid from flowing to the second piston from the second port with a third seal that is an axially forward seal located between the second piston and the output shaft and a fourth seal that is an axially aft seal located between the second piston and the output shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
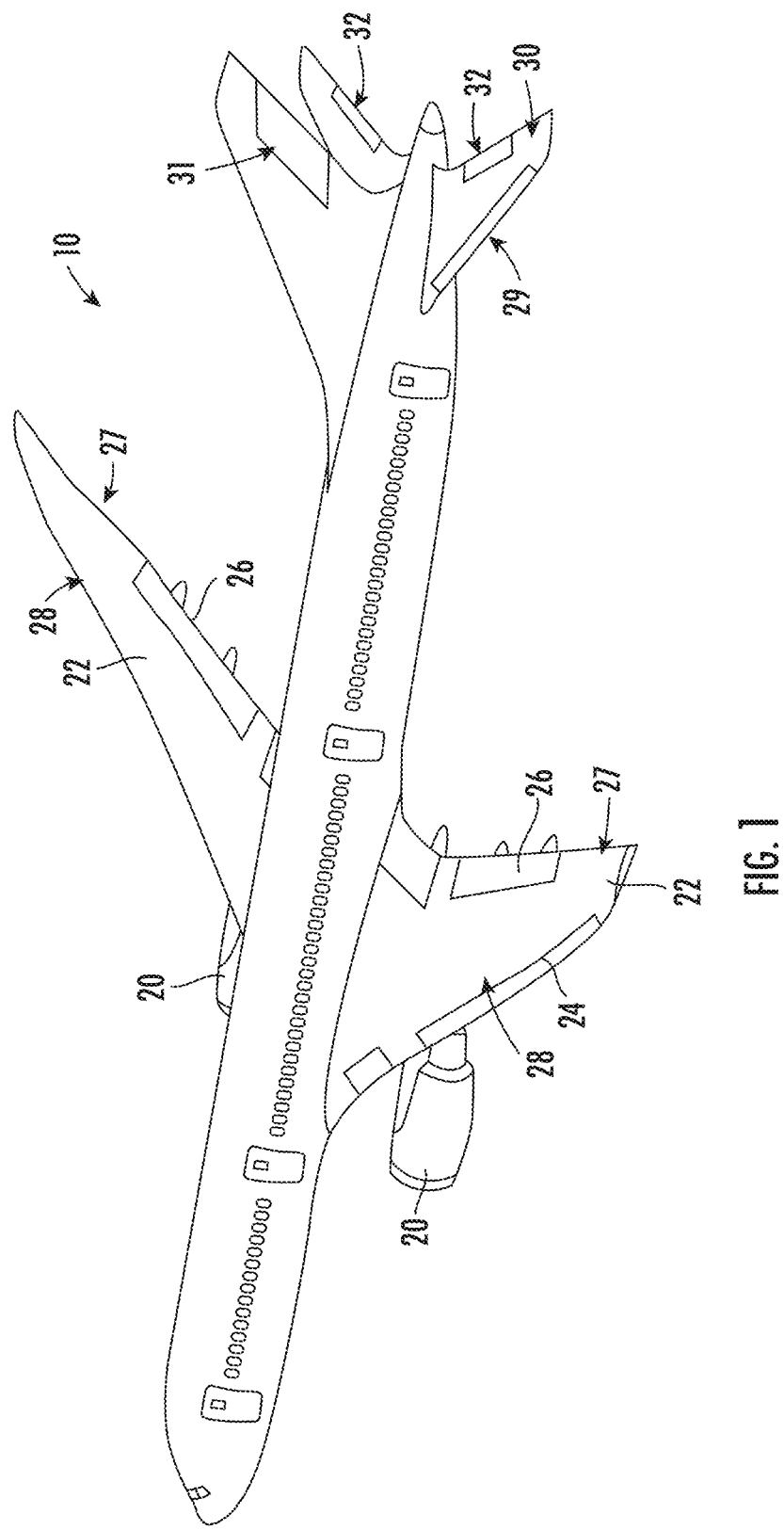
FIG. 1 is a perspective view of an aircraft that includes aerodynamic surfaces where embodiments of the present invention can be implemented.

FIG. 1 illustrates an example of a commercial aircraft 10 having aircraft engines surrounded by (or otherwise carried in) a nacelles 20. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems. The leading edges of the wings and nacelles are especially vulnerable to the formation of ice.

Figure 2:
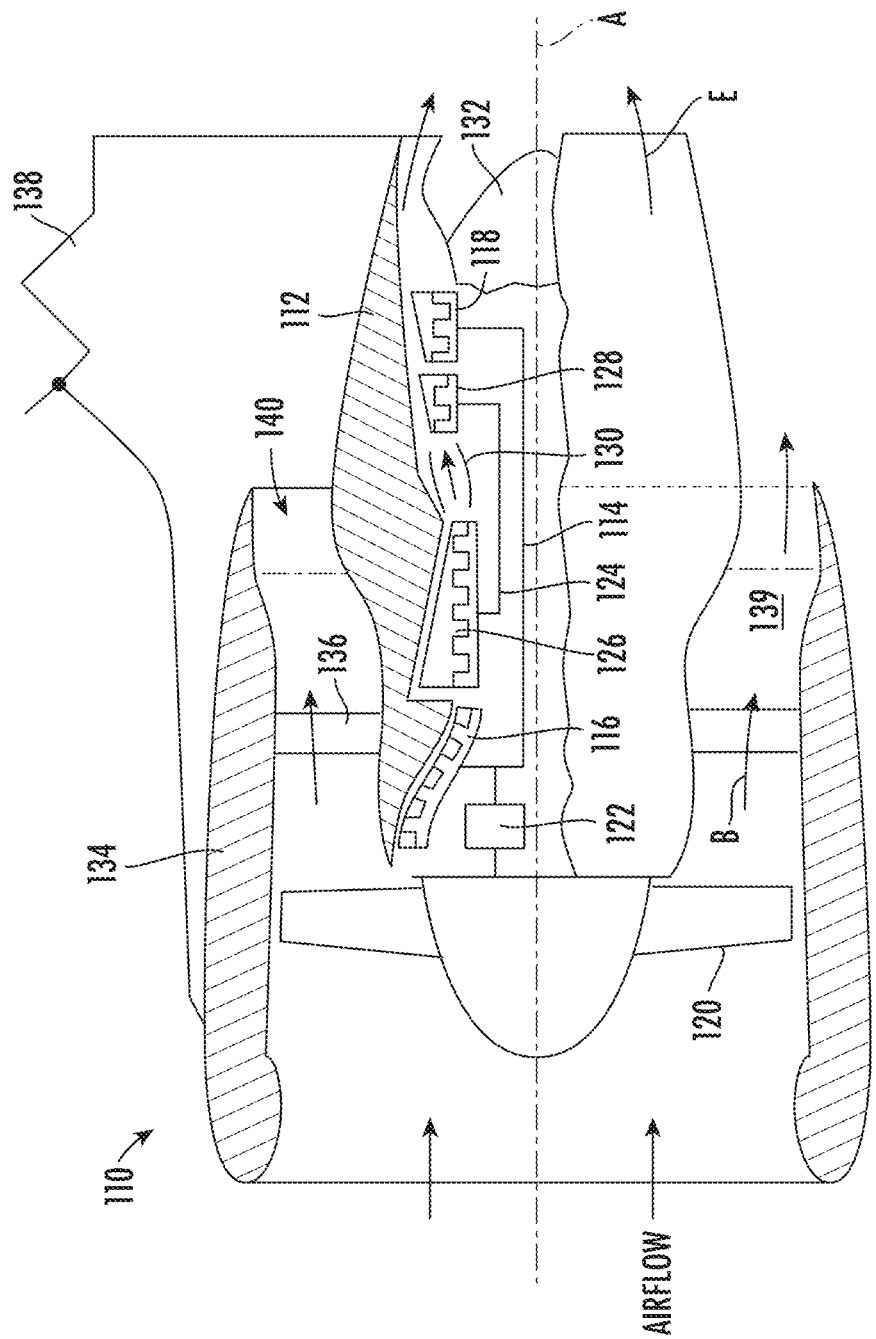
FIG. 2 illustrates a cross section of a gas turbine engine wherein embodiments of the present invention can be implemented.

A turbine 110 is shown in FIG. 2. A pylon 138 secures the engine 110 to an aircraft. The engine 110 includes a core nacelle 112 that houses a low pressure spool 114 (the low spool 114) and a high pressure spool 124 (the high spool 124) rotatable about an axis A. The low spool 114 supports a low pressure compressor 116 and low pressure turbine 118. In the example, the low spool 14 drives a turbofan 120 through a gear train 122. The high spool 124 supports a high pressure compressor 126 and high pressure turbine 128. A combustor 130 is arranged between the high pressure compressor 126 and high pressure turbine 128. Compressed air from compressors 116, 126 mixes with fuel from the combustor 130 and is expanded in turbines 118, 128. Airflow enters a fan nacelle 134, which surrounds the core nacelle 112 and turbofan 120. The turbofan 20 directs air into the core nacelle 112, which is used to drive the turbines 118, 128, as is known in the art. Turbine exhaust E exits the core nacelle 112 once it has been expanded in the turbines 118, 128, in a passage provided between the core nacelle and a tail cone 132. The core nacelle 112 is supported within the fan nacelle 134 by structure 136, which are commonly referred to as upper and lower bifurcations. A generally annular bypass flow path 139 is arranged between the core and fan nacelles 112, 134. The example illustrated in FIG. 2 depicts a high bypass flow arrangement in which approximately eighty percent of the airflow entering the fan nacelle 134 bypasses the core nacelle 112. The bypass flow B within the bypass flow path 139 exits the fan nacelle 134 through a nozzle exit area 140. For the engine 110 shown in FIG. 2, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 110 includes a structure associated with the nozzle exit area 140 to change the physical area and geometry to manipulate the thrust provided by the bypass flow B. However, it should be understood that the nozzle exit area might be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location in the bypass flow path.

Figure 3:
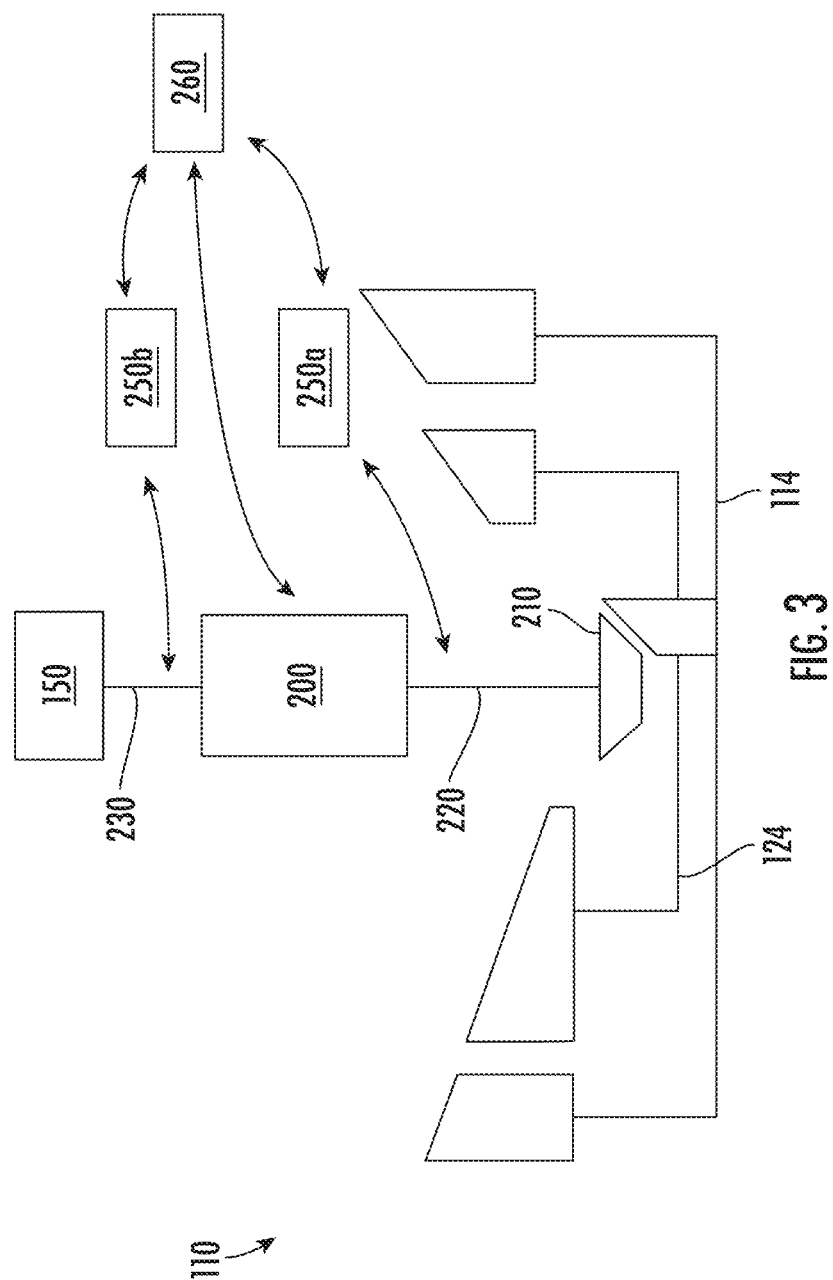
FIG. 3 schematically illustrates features of a gas turbine engine including a transmission transferring power between a low spool and an accessory according to an embodiment.

As illustrated in FIG. 3, according to the disclosure, energy to power one or more accessories 150 may be obtained from the low spool 114 through an intermediate transmission 200. The transmission 200 may be connected to the engine 110 by one or more bevel gears 210 and through a shaft 220 functioning as input shaft for the transmission 200. As shown a first bevel gear 210a is coupled to the low spool 114. The first bevel gear 210a meshes with and transfers rotational power to a second bevel gear 210b that is connected to the input shaft 220.

The accessories 150 may be powered by an output shaft 230 extending between the transmission 200 and the accessories 150. Extracting power from the low spool 124 may allow the high spool 114 to be made more efficient while also allowing for a lower idle speed which decreases brake wear. A difference in optimum speed ratios between accessories 150 and the low spool 114 may hinder an ability to extract power from the low spool 114. Optimum accessory speed ratio ranges may be approximately 2:1 while speed ratio ranges in the low spool 114 may be as high as 10:1. According to an embodiment, the transmission 200 disclosed herein may convert a large input speed ratio range (8:1) from the low spool 114 into a smaller output speed ratio range (2:1) for driving engine accessories 150. Speed sensors generally identified as 250, including a first speed sensor 250a on the input shaft 220 for the transmission and a second speed sensor 250b on the transmission output shaft 230, may communicate with a transmission controller 260 to initiate shifting though one or more clutches and one or more band brakes (disclosed in detail below). Overlapping ranges between the speed ratios may be provided to prevent "doorbelling" at the shift points. The disclosed transmission may convert a wide input speed range (8:1) into a narrower output speed range (2:1) for engine accessories 150.

Figure 4:
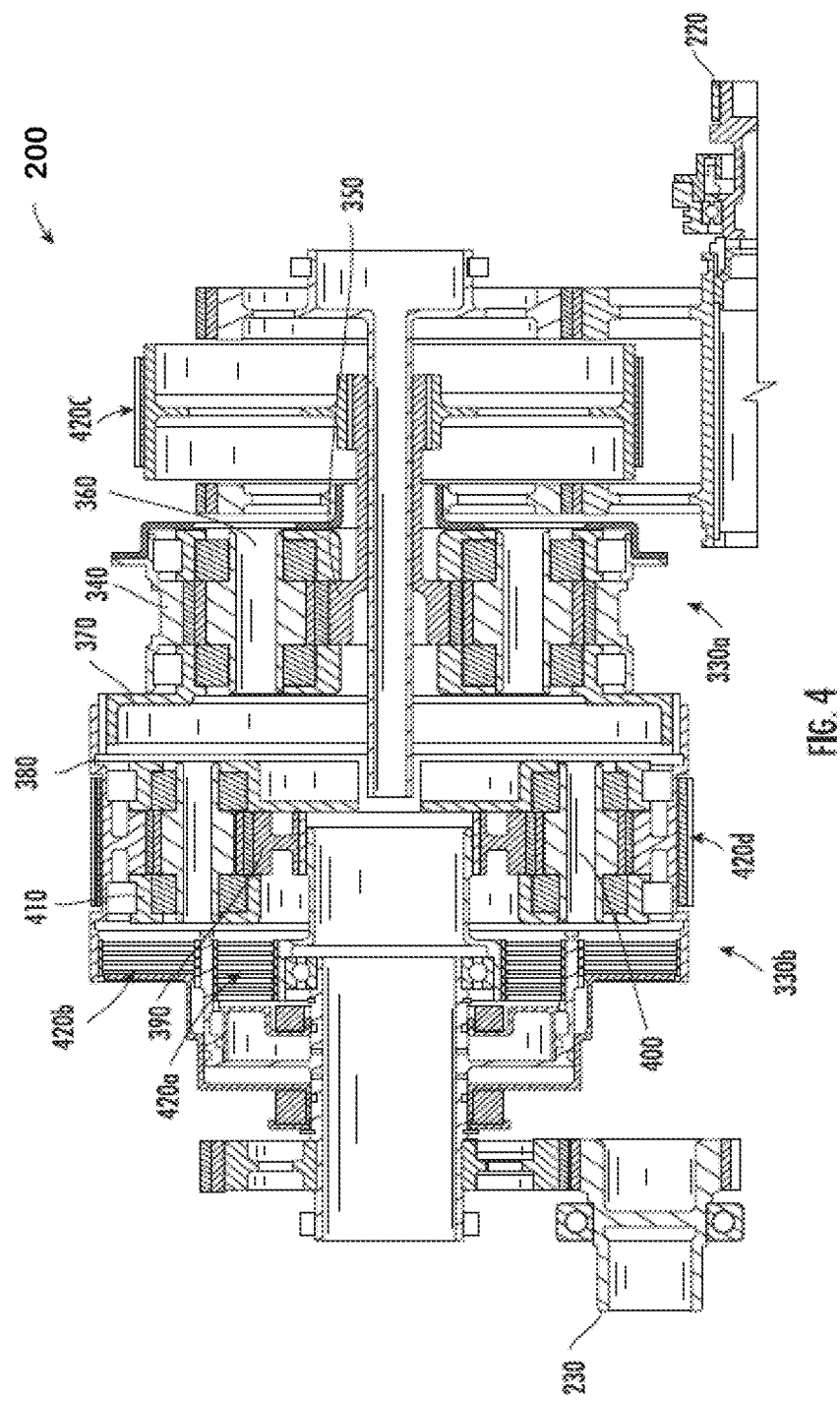
FIG. 4 illustrates features of a transmission according to an embodiment.

Turning to FIG. 4, disclosed in greater detail is the transmission 200. The transmission 200 may include the input shaft 220 configured to operationally connect to the low pressure section 114 of the gas turbine engine 110. The output shaft 230 may be configured to drive an aircraft accessory 150 (FIG. 3). A gear system generally referred to as 330 may be connected between the input shaft 220 and the output shaft 230.

The gear system 330 may include a first epicyclical gear set 330a (the first gear set 330a) and a second epicyclical gear set 330b (the second gear set 330b). The first gear set 330a may include a first ring gear 340, a first sun gear 350, a first planetary gear set 360, and a first planetary carrier 370 (the first carrier 370). The first carrier 370 may be connected to the first planetary gear set 360. The second gear set 330b may include a second ring gear 380, a second sun gear 390, a second planetary gear set 400, and a second planetary carrier 410 (the second carrier 410). The second carrier 410 may be connected to the second planetary gear set 400. The input shaft 220 may be coupled to the first ring gear 340 and the second carrier 410. In addition, the second ring gear 380 may be coupled to the first carrier 370. In addition, a plurality of clutches generally referred to as 420 may engage the first gear set 330a and the second gear set 330b. The plurality of clutches 420 may be adapted for shifting the transmission 200 to generate a plurality of respectively overlapping transmission speeds, discussed in greater detail below. In one embodiment, the second gear set 330b may be axially adjacent to the first gear set 330a.

The plurality of clutches 420 may comprise a first clutch 420a, a second clutch 420b, a third clutch 420c and a fourth clutch 420d. The first clutch 420a may be configured for being shifted by the engine controller 260 (FIG. 3) between a closed state and an opened state. In the closed state, the first clutch 420a may rotationally couple the output shaft 230 with the second sun gear 390. In the opened state, the first clutch 420a may rotationally decouple (not rotationally couple) the output shaft 230 from the second sun gear 390.

The second clutch 420b may be configured for being shifted between a closed state and an opened state. In the closed state, the second clutch 420b may rotationally couple the output shaft 230 with the second ring gear 380 and the first carrier 370. In the opened state, the second clutch 420b may rotationally decouple the output shaft 230 from the second ring gear 380 and the first carrier 370.

The third clutch 420c may be configured for being shifted between a closed state and an opened state. In the closed state, the third clutch 420c may rotationally brake (prevent rotation of) the first sun gear 350. In the opened state, the third clutch 420c may rotationally release from braking (not prevent rotation of) the first sun gear 350.

The fourth clutch 420d may be configured for being shifted between a closed state and an opened state. In the closed state, the fourth clutch 420d may rotationally brake the second ring gear 380 and the first carrier 370. In the opened state, the fourth clutch 420d may rotationally release from braking the second ring gear 380 and the first carrier 370.

Figure 5:
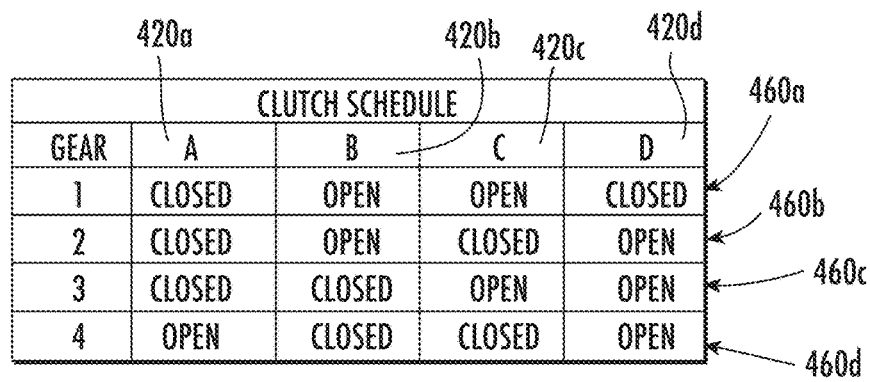
FIG. 5 lists a clutch schedule for providing different transmission speeds for a disclosed transmission according to an embodiment.
Figure 6:
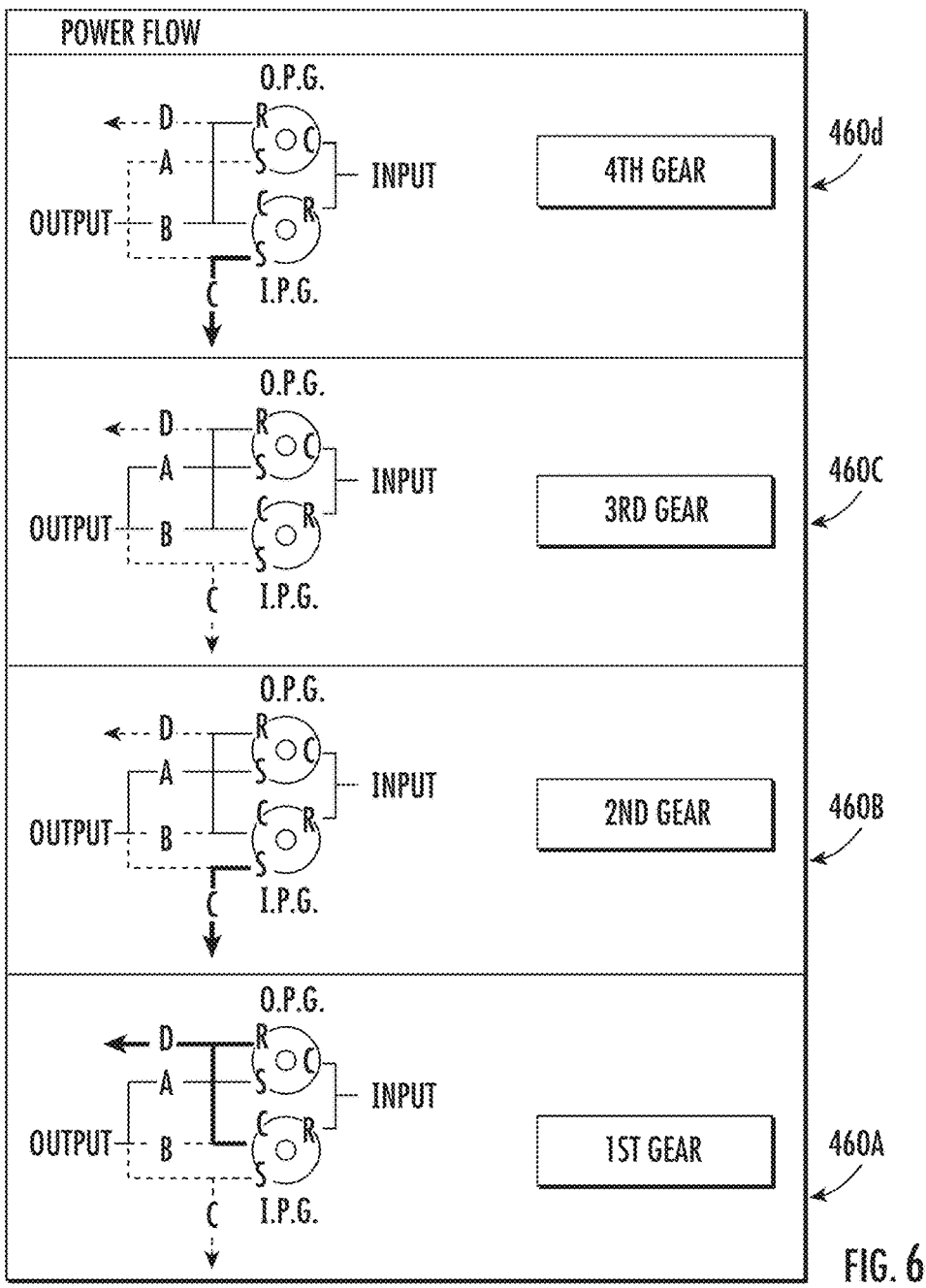
FIG. 6 schematically illustrates an implementation of a clutch schedule for providing different transmission speeds for a disclosed transmission according to an embodiment.

Turning to FIGS. 5 and 6, the plurality of transmission speeds are generally referred to as 460 and include a first transmission speed 460a, a second transmission speed 460b, a third transmission speed 460c and a fourth transmission speed 460d. For each of the transmission speeds 460, the clutches 420 may be configured for operating pursuant to a clutch schedule that is actuated, for example, by the engine controller 260 (FIG. 3). The clutches 420 are identified alphabetically in FIGS. 5 and 6, wherein "A" represents the first clutch 420a, "B" represents the second clutch 420b, "C" represents the third clutch 420c, and "D" represents the fourth clutch 420d. In addition, in FIG. 6, "IPG" represents the input (first) planetary gear system 330a, "OPG" represents output (second) planetary gear system 330b, "S" represents the sun gear (350 or 390) for respective gear system 330, "R" represents the ring gear (340 or 380) for respective gear system 330, and "C" represents the planetary carrier (370 or 410) for respective gear system 330.

For each of the plurality of transmission speeds 460, the output shaft 230 may be engaged to convert speed and power at the input shaft 220 to speed and power at the output shaft 230. Engaging the output shaft 230 may be achieved by shifting one or both of the first clutch 420a and the second clutch 420b to the closed state. In addition, for each of the transmission speeds 460, two of the plurality of clutches 420 may be opened and another two of the plurality of clutches 420 are closed. For each of the transmission speeds 460, at least one of the first clutch 420a and the second clutch 420b is in the closed state and at least one of the third clutch 420c and the fourth clutch 420d is in the opened state. In addition, for at least one of the transmission speeds 460, both of the first clutch 420a and the second clutch 420d are in the closed state.

As illustrated in FIG. 5, in the first transmission speed 460a, the first clutch 420a may be in the closed state and the second clutch 420b may be in the opened state. In addition, in the first transmission speed 460a, the third clutch 420c may be in the opened state, and the fourth clutch 420d may be in the closed state. From this configuration, power is directed from the input shaft 220 to the second carrier 410. The first carrier 370 and the second ring gear 380 are stopped from rotating by action of the fourth clutch 420d. Power travels from the second sun gear 390 to the output shaft 230 by action of the first clutch 420a.

In the second transmission speed 460b, the first clutch 420a may be in the closed state and the second clutch 420b may be in the opened state. In addition, in the second transmission speed 460b, the third clutch 420c may be in the closed state, and the fourth clutch 420d may be in the opened state. From this configuration, power is directed from the input shaft 220 to the first ring gear 340 and the second carrier 410. The first sun gear 350 is stopped from rotating by action of the third clutch 420c. The rotational speed of the first carrier 370 and the second ring gear 380 determines the speed of the second sun gear 390 which drives the output shaft 230 through the first clutch 420a.

Rotational speeds of the first carrier 370 and the second carrier 380 are also a function of the specific gear-tooth ratios of each of the gears in each gear set. However, the configuration of such specific gear-tooth ratios would be appreciated by one of ordinary skill in the art and are therefore not discussed in detail herein. The specific gear are not to be confused with the total gear ratios for the gear sets, which is disclosed in detail herein (below) with reference to FIG. 8.

In the third transmission speed 460d, the first clutch 420a may be in the closed state and the second clutch 420b may be in the closed state. In addition, in the third transmission speed 460c, the third clutch 420c may be in the opened state, and the fourth clutch 420d may be in the opened state. From this configuration, power is directed from the input shaft 220 to the first ring gear 340 and the second carrier 410. The first carrier 370 and the second ring gear 380 engage the output shaft 230 by action of the second clutch 420b. The second sun gear 390 engages the output shaft 230 by action of the first clutch 420a. By the principle of operation of an epicyclical gear set, a straight-thru condition is achieved whenever two components of the gear set are rotationally coupled. The action of the first clutch 420a and second clutch 420b rotationally couples the second sun gear 390 and the second ring gear 380 resulting in a straight-thru condition. Thus, the output shaft 230 is engaged by parallel action of the first clutch 420a and second clutch 420b.

In the fourth transmission speed 460d, the first clutch 420a may be in the opened state and the second clutch 420b may be in the closed state. In addition, in the fourth transmission speed 460c, the third clutch 420c may be in the closed state and the fourth clutch 420d may be in the opened state. From this configuration, power is directed from the input shaft 220 to the first ring gear 340 and the second carrier 410. The first sun gear 350 is stopped from rotating by action of the third clutch 420c. The first carrier 370 and the second ring gear 380 transfer power to the output shaft 230 by action of the second clutch 420b. As such, the second ring gear 380 functions as a second intermediate output shaft for the transmission 200.

Figure 7:
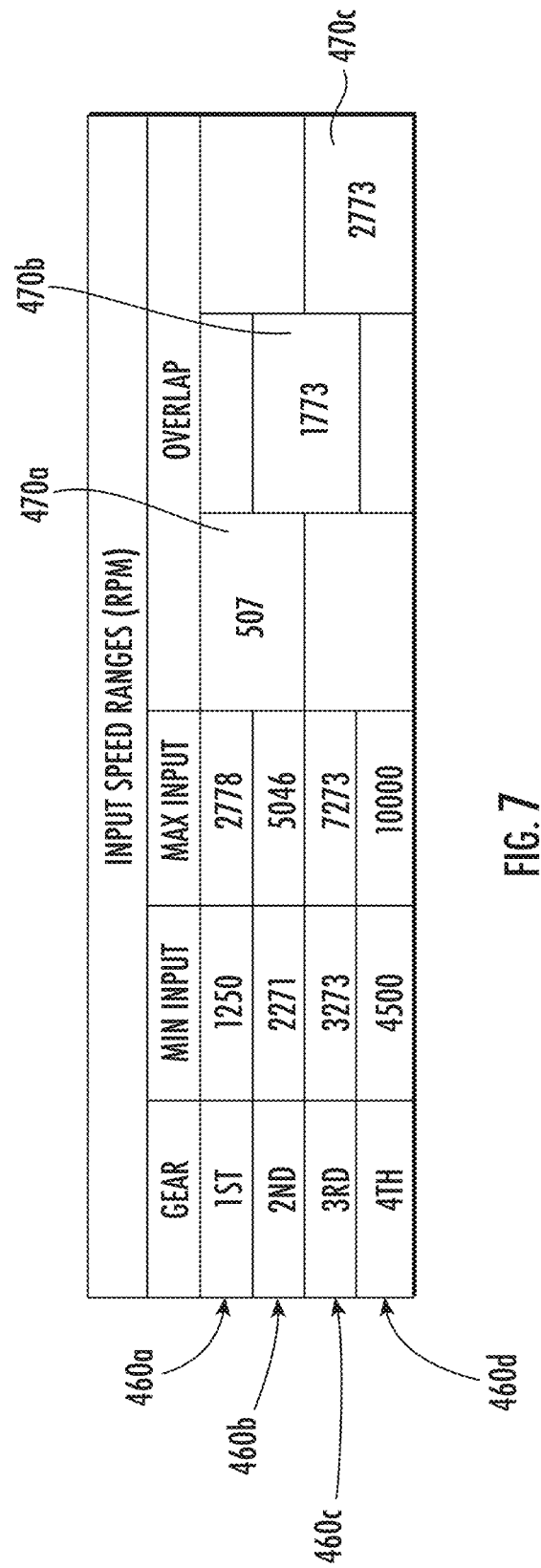
FIG. 7 lists overlapping speed ranges for different transmission speeds for a disclosed transmission according to an embodiment.

Turning to FIG. 7, the first transmission speed 460a and the second transmission speed 460b may overlap by a first overlapping speed range 470a. In addition, the second transmission speed and third transmission speed may overlap by a second overlapping speed range 470b. The second overlapping speed range may be broader than three times the first overlapping speed range. Further, the third transmission speed and the fourth transmission speed may overlap by a third overlapping speed range 470c. The third overlapping speed range may be broader than five times the first overlapping speed range.

As illustrated, in one embodiment, the minimum input and maximum input speeds for the first transmission speed 460a may be 1250 rpm (revolutions per minute) and 2778 rpm, respectively. The minimum input and maximum input speeds for the first transmission speed 460b may be 2271 rpm and 5046 rpm, respectively. The minimum input and maximum input speeds for the third transmission speed 460c may be 3273 rpm and 7273 rpm, respectively. The minimum input and maximum input speeds for the fourth transmission speed 460d may be 4500 rpm and 1000 rpm, respectively. The first speed range overlap 470a may be 507 rpm. The second speed range overlap 470b may be 1773 rpm. The third speed range overlap 470c may be 2773 rpm. These speed ranges and speed range overlaps given in FIG. 7 are for reference only and are not intended to be limiting.

Figure 8:
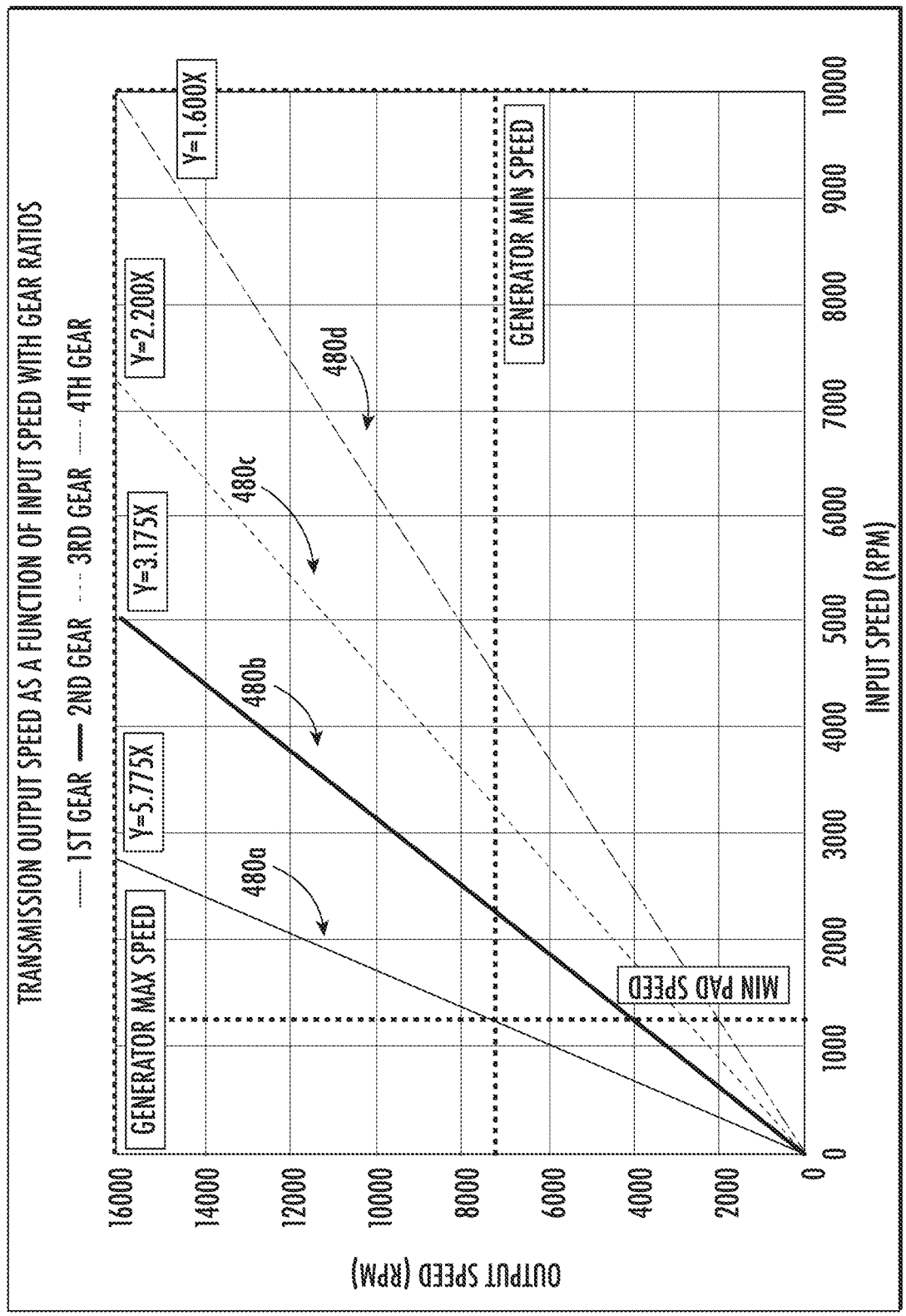
FIG. 8 is a graph of output/input ratios for different transmission speeds according to an embodiment.

Turning to FIG. 8, the first transmission speed 460a may generate a first output/input speed ratio 480a. In addition, the second transmission speed 460b may generate a second output/input speed ratio 480b. The second output/input speed ratio that may be less than sixty percent of the first output/input speed ratio 480a. The third transmission speed 460c may generate a third output/input speed ratio 480c. The third output/input speed ratio 480c may be less than the second output/input speed ratio 480b and less than forty percent of the first output/input ratio 480a. The fourth transmission speed 460d may generate a fourth output/input speed ratio 480d. The fourth output/input speed ratio 480d that may be less than the third output/input speed ratio 480c and less than thirty percent of the first output/input ratio 480a. As illustrated, the first output/input speed ratio 480a may follow an equation of Y=5.775x, which is a linear equation where X is the input speed and Y is the output speed. The second output/input speed ratio 480b may follow an equation of Y=3.175x. The third output/input speed ratio 480c may follow an equation of Y=1.600x.

As provided in the above disclosure, the first sun gear 350 and second ring gear 380 function as speed trimming gears to produce a desired gear ratio for their respective gear set 330a and 330b. By selectively braking these gears, 350 and 380, the output speed for the gear sets, 330a and 330b, may be determined. If the speed of gears 350 and 380 is not known, the output speed for the gear set 330a and 330b may be indeterminate. For example, in the first transmission speed 460a, the speed of the first carrier 370 and the second ring gear 380 is known, because these gears 370, 380 are not spinning (zero rpm). In this configuration, a speed of the second carrier 410 is known because its speed is a function of the speed of the input shaft 220. The speed of the second sun gear 390 and the speed of the output shaft 230 can then be calculated based on the input/output speed ratios 480 for the transmission 200.

Figure 9:
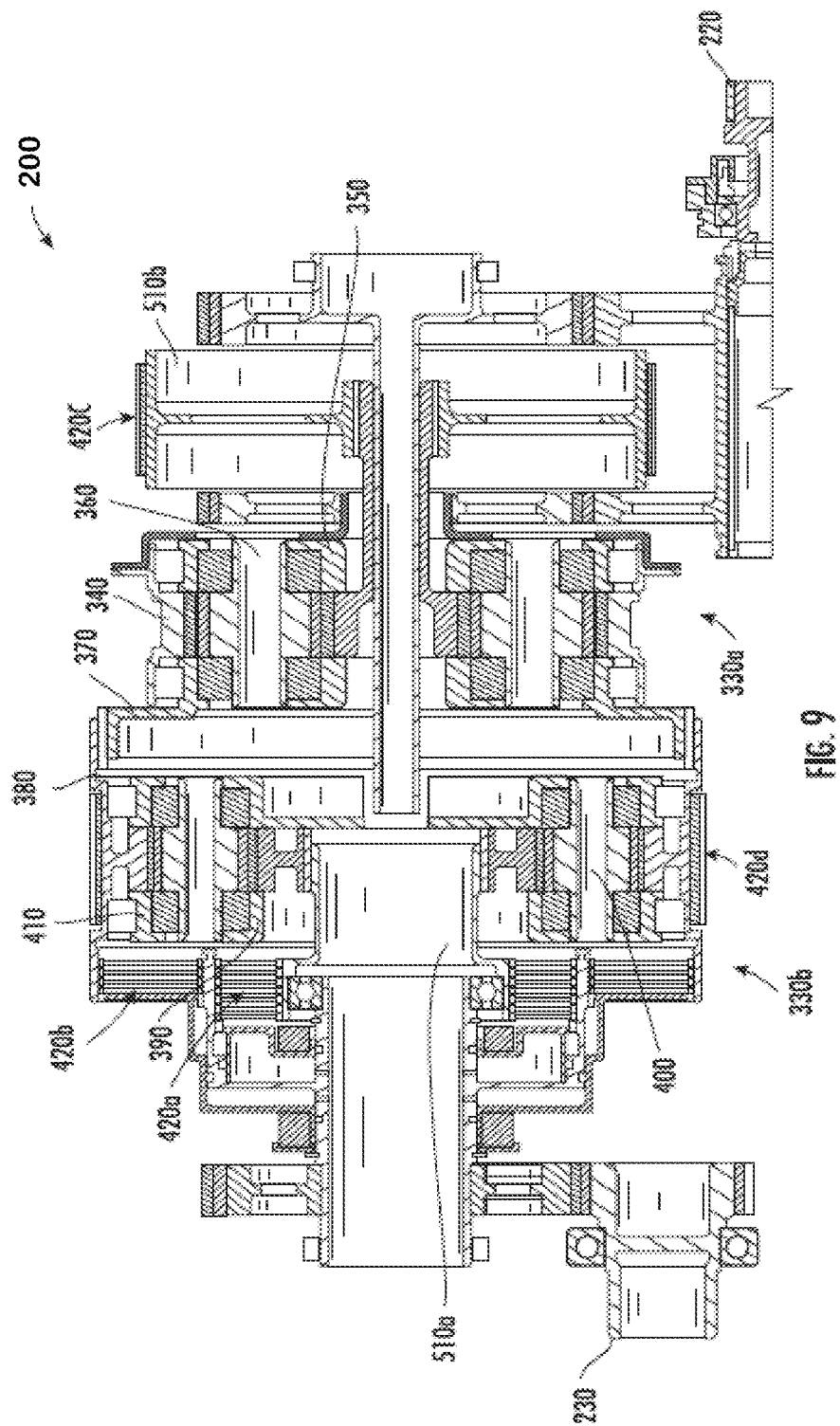
FIG. 9 illustrates additional features of a transmission according to an embodiment.

Turning to FIG. 9, the transmission 200 may include a plurality of rotors generally referred to as 510. The plurality of rotors may include a first rotor 510a and a second rotor 510b. The first rotor 510a may be coupled to the second sun gear 390 so that the first rotor 510a may function as a first intermediate output shaft for the transmission 200. The first rotor 510a may be a stub shaft that may be axially aligned with the input shaft 220 and the output shaft 230. The first rotor 510a may be axially intermediate the input shaft 220 and the output shaft 230. The first clutch 420a may be coupled to the first rotor 510a so that engaging the first clutch 420a may engage the first rotor 510a. The second rotor 510b may be coupled to the first sun gear 350. In addition, the third clutch 420c may be a first band brake that may be configured to engage the second rotor 510b. The fourth clutch 420d may be a second band brake that may be configured to engage the second ring gear 380.

Figure 10:
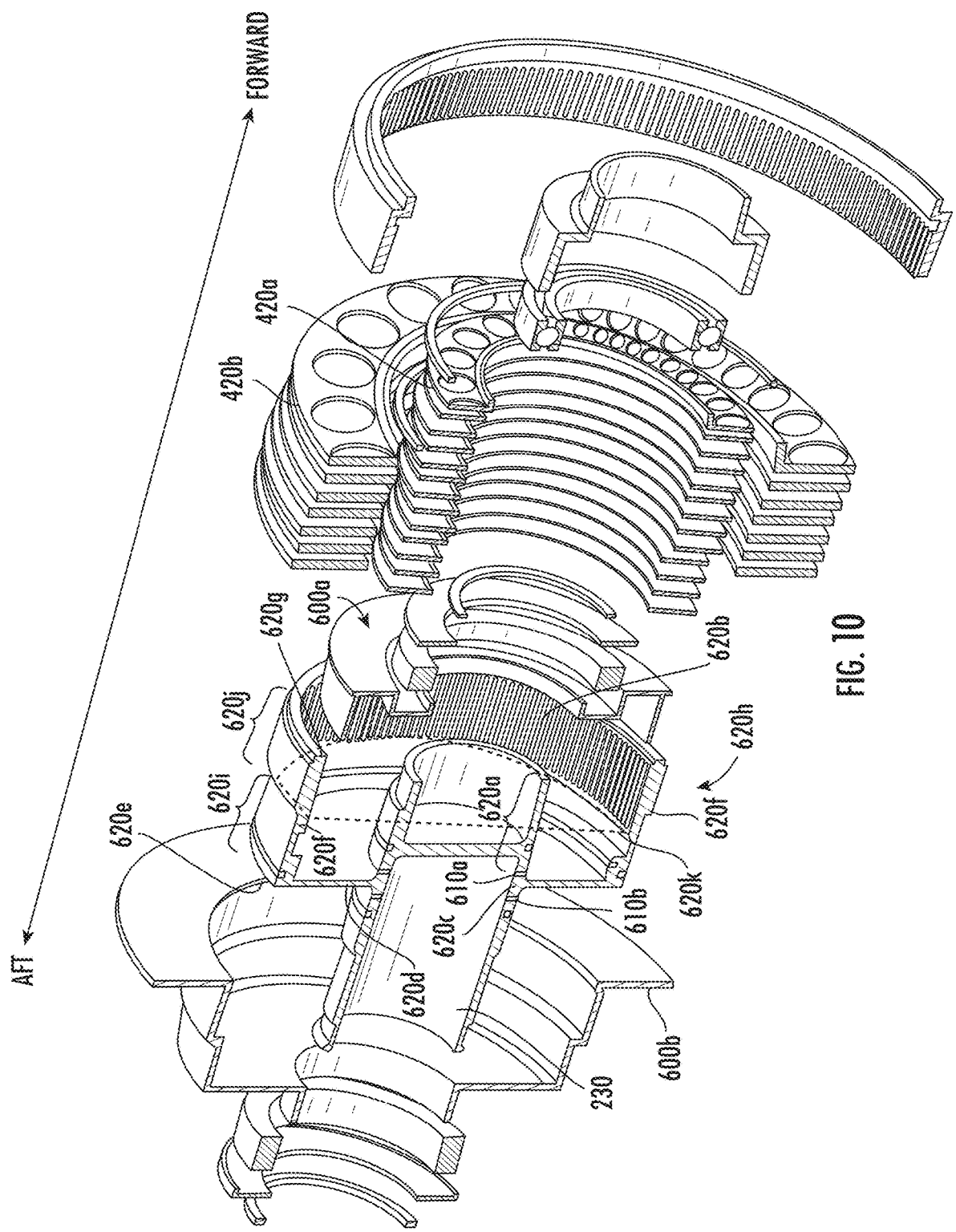
FIG. 10 illustrates additional features of an output shaft of a transmission according to an embodiment.

Turning to FIG. 10, further illustrated are the plurality of clutches 420 that are axially aligned and radially offset. The plurality of clutches 420, as indicated, are configured to engage in parallel the output shaft 230 and shift the transmission 200 to generate a plurality gear speeds. A plurality of pistons generally referred to as 600 may be configured to engage the respective plurality of clutches 420. The plurality of pistons 600 may be hydraulically controlled and adapted to receive fluid from a respective plurality of ports generally referred to as 610 in the output shaft 230.

The plurality of clutches 420 may include a first clutch 420a and a second clutch 420b. The plurality of pistons 600 may include a first piston 600a and a second piston 600b. The first piston 600a may engage the first clutch 420a and the second piston 600b may engage the second clutch 420b. The plurality of ports 610 in the output shaft may include a first port 610a and a second port 610b. The first port 610a may communicate fluid to the first piston 600a. The second port 610b may be axially aft of the first port 610a and may fluidly communicate fluid to the second piston 600b.

The output shaft 230 may include first plurality of segments generally referred to as 620, including a first segment 620a that extends forward to a first axial end 620b from a location 620c on the output shaft 230 that is between the plurality of ports 610. A second segment 620d may be radially extending to an aft end 620e of a third segment 620f. The third segment 620f may extend axially forward and end at a second axial end 620g that is axially proximate the first axial end 620b. A first internal cavity 620h may be defined by the first plurality of segments 620 of the output shaft 230, with the first fluid port 610a being fluidly connected to the first internal cavity 620h. An axially aft portion 620i of the first internal cavity 620h may form a housing for the first piston 600a (the first piston housing 620i). An axially forward portion 620j of the internal cavity 620h may form a housing for the first clutch 420a (the first clutch housing 620j). The first piston housing 620i and the first clutch housing 620j are separated by phantom line 620k for illustrative purposes. The first clutch 420a is radially within the first clutch housing 620j. The second clutch 420b is radially exterior to the first clutch housing 620j.

Figure 11:
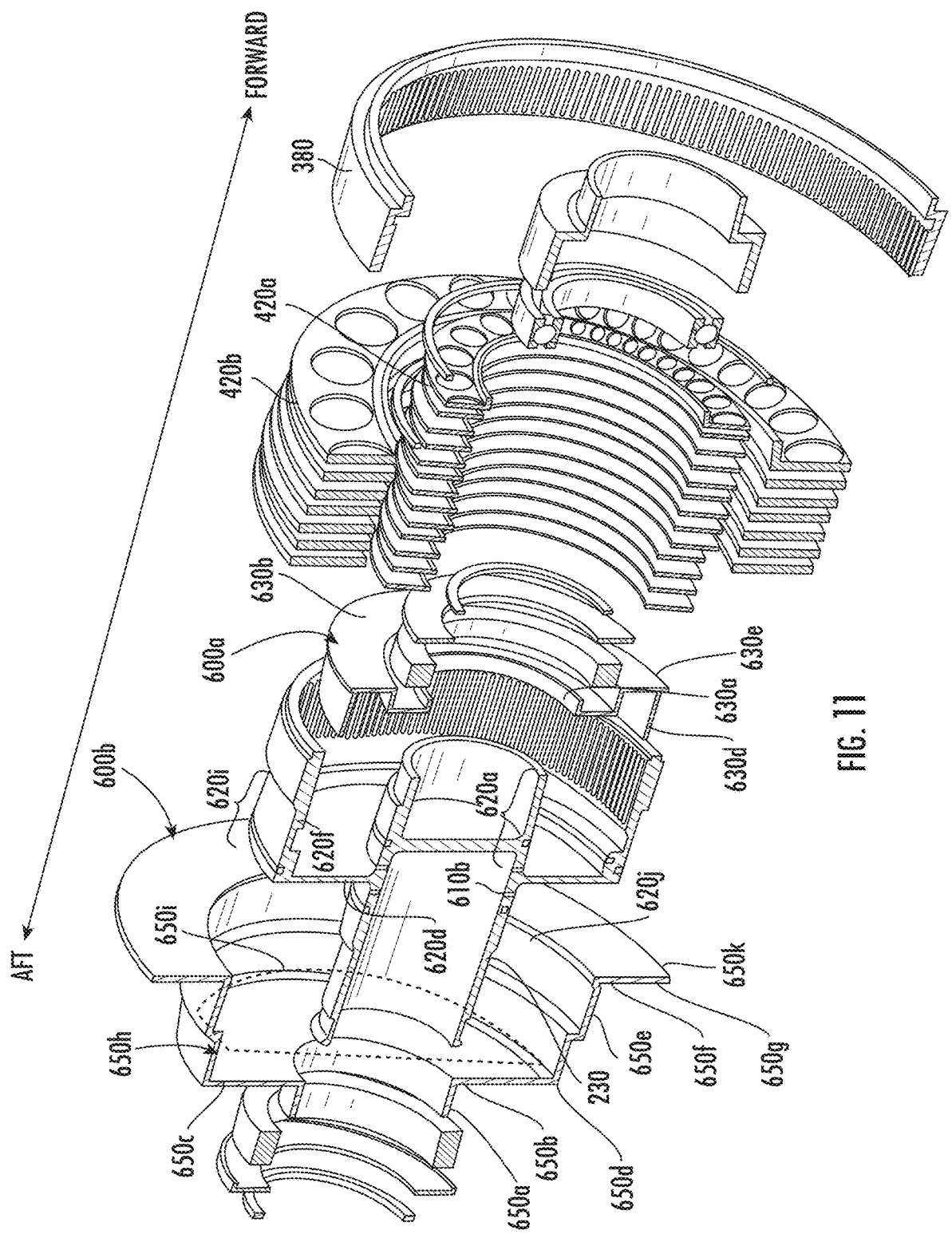
FIG. 11 illustrates additional features of pistons that engage clutches to engage an output shaft of a transmission according to an embodiment.

Turning to FIG. 11, the first piston 600a may be formed by a first slider shaft movably positioned within the first piston housing 620i. The first piston 600a may include a second plurality of segments generally referenced by 630, including a fourth segment 630a that is axially extending and configured to slide along the first segment 620a within the piston housing 630i. The fourth segment 630a may be sized so that during a full range of motion along the first segment 620a in the first piston housing 620i, the first port 610a remains in fluid communication with the first piston housing 620i. A fifth segment 630b may be radially outwardly extending and may be configured to press against the first clutch 420a. The fifth segment 630b may connect with a forward end 630c of a sixth segment 630d. The sixth segment 630d may extend axially aft by a span that is the same as the axial span of the first piston housing 630i. The sixth segment 630d may be configured to slide along the third member 620f within the piston housing 630i. In addition, a radially outward lip 630e extending from the fifth segment 630b engages the output shaft 230 to rotate with the output shaft 230. As illustrated, fluid action through the first port 610a moves the first piston 600a in forward and aft directions to engage and release the first clutch 420a.

The second piston 600b may be formed by a second slider shaft movably positioned between the output shaft 230 aft of the second segment 620d, and second intermediate output shaft 380. The second piston 600b includes a second plurality of segments generally referenced by 650, including a seventh segment 650a that is axially extending and configured to slide along the output shaft 230. Connected to a forward end 650b of the seventh segment 650a is an eighth segment 650c that is radially outwardly extending, parallel with the second segment 655d, and connects with an aft end 650d of a ninth segment 650e. The ninth segment 650e extends axially aft to at least partially slide against the third segment 630f of the output shaft 230. The ninth segment 650e extends axially aft to a radially inner end 650f of a tenth segment 650g. The tenth segment 650g extends axially to the second intermediate output shaft 380 and is configured to engage the second clutch 420b.

A second internal cavity 650h, identified forward of phantom line 650i in the second piston 600b, is formed between the second piston 600b and the output shaft 230. The second piston 600b is configured so that the second fluid port 610b remains in fluid communication with the second internal cavity 650h. Fluid action through the second port 610b moves the second piston 600b in forward and aft directions to engage and release the second clutch 420b. In addition, a radially inner lip 650j extending from the tenth member 650g engages the output shaft 230 to rotate with the output shaft 230. A radially outer lip 650k extending from the tenth member 650g engages with the second intermediate output shaft 380 to rotate with the second intermediate output shaft.

Figure 12:
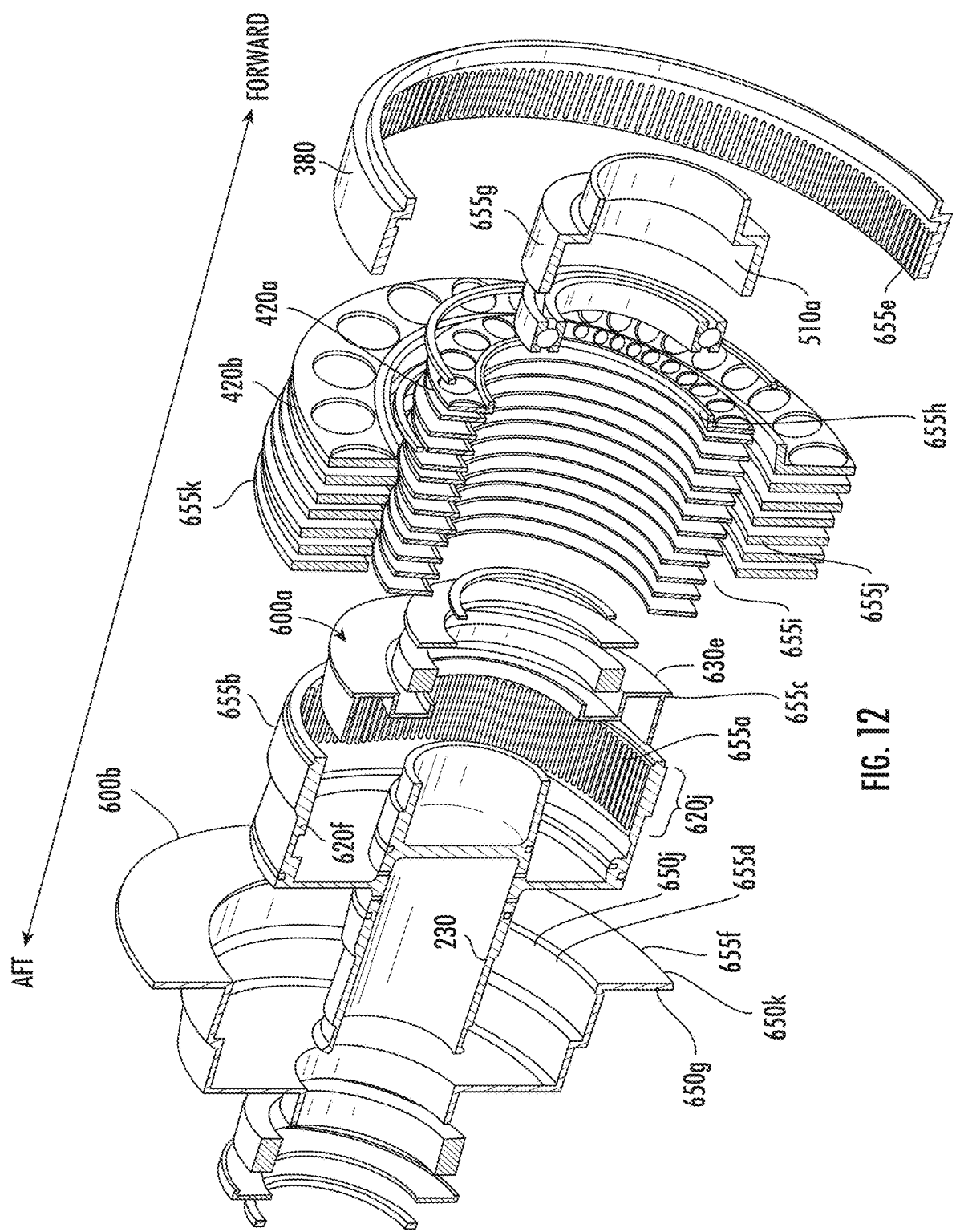
FIG. 12 illustrates additional features of splines that provide for coupled rotation between the output shaft, pistons and clutches of a transmission according to an embodiment.
Figure 13A:
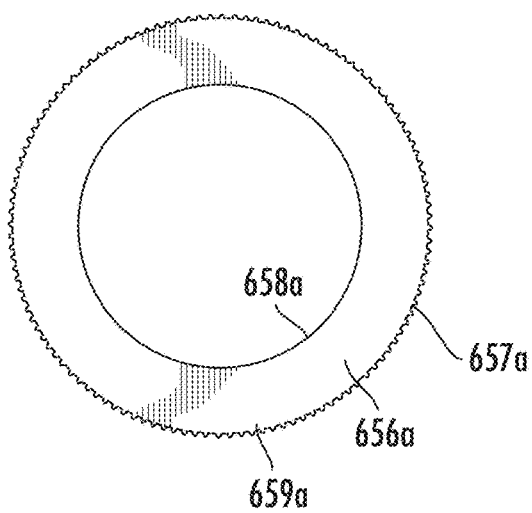
FIGS. 13A-13D illustrate clutch plates that may be utilized in clutches of a transmission according to an embodiment.
Figure 13B:
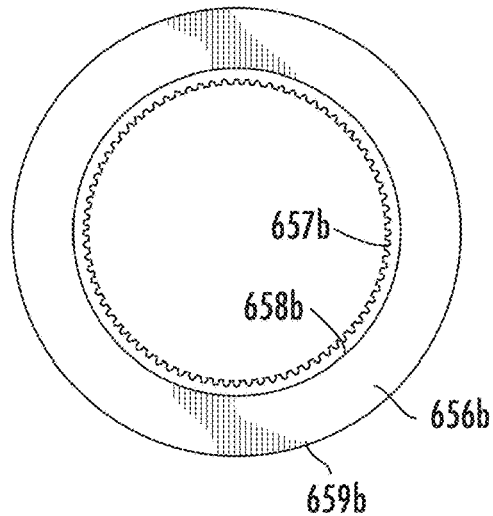
Figure 13C:
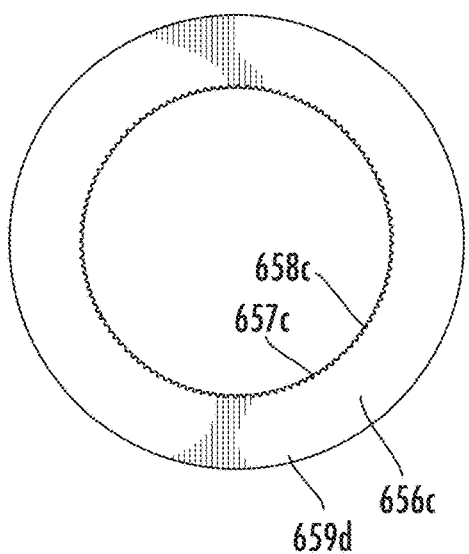
Figure 13D:
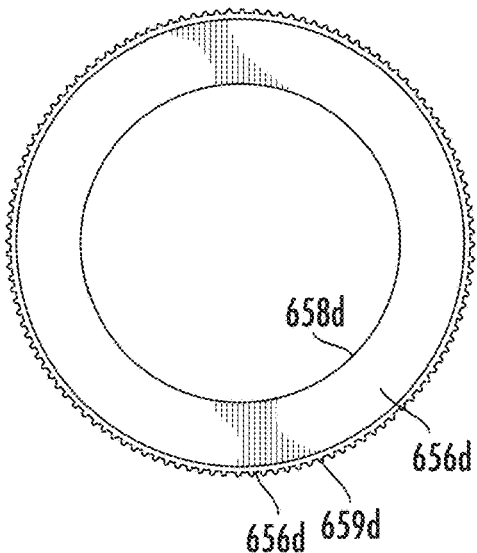

Turning to FIG. 12, the transmission 200 includes a plurality of splines generally referenced as 655. The first clutch housing 620j may include a first spline 655a that is a radially inner spline and a second spline 655b that is a radial outer spline. The first piston 600a may include a third spline 655c that is a radial outer spline configured to engage with the first spline 655a. The third spline 655c may extend from the radially extending lip 630e of the first piston 600a. The second piston 600b may include a fourth spline 655d that may be a radial inner spline configured to engage with the second spline 655b. The fourth spline 655d may extend from the radially extending lip 650j.

The second intermediate output shaft 380 may include a fifth spline 655e that may be a radially inner spline. The second piston 600b may include a sixth spline 655f that may be is radially outer spline configured to engage with the fifth spline 655e. The sixth spline 655f may extend from the radial extending lip 650k of the second piston 600b. The first intermediate output shaft 510a may have a seventh spline 655g that may be a radially outer spline. The first clutch 420a may include an eighth spline 655h that may be a radially inner spline configured to engage with the seventh spline 655g. A ninth spline 655i in the first clutch 420a may be is a radially outer spline configured to engage with the first spline 655a.

The second clutch 420b may include a tenth spline 655j that may be a radially inner spline configured to engage with the second spline 655b. In addition, an eleventh spline 655k may be provided in the second clutch 420b. The eleventh spline 655k may be a radially outer spline configured to engage with the second intermediate output shaft 380.

With the above configuration, each of the clutches 420 has an inner spline and an outer spline. This is achieved by utilizing a clutch pack with alternating discs generally referred to as 656 having splines facing alternating radial directions. For example, as illustrated in FIGS. 13a-13d, respectively, the first clutch 420a may have an inner clutch separator plate 656a and an inner clutch friction plate 656b. The second clutch 420b may have an inner clutch separator plate 656c and an inner clutch friction plate 656d. Each of the discs 656 has a series of spline teeth generally referred to as 657 on an inner diameter edge generally referred to as 658 or an outer diameter edge generally referred to as 659. Specifically, in the first clutch 420a, the inner clutch separator plate 656a has spline teeth 657a on the outer diameter edge 659a and the inner clutch friction plate 656b has spline teeth 657b on the inner diameter edge 658b. In the second clutch 420b, the inner clutch separator plate 656c has spline teeth 657c on the inner diameter edge 658c and the inner clutch friction plate 656d has spline teeth 657d on the outer diameter edge 659d. These relationships are not meant to be limiting.

Turning back to FIG. 12, when the clutches 420 are not engaged, the alternating discs in each clutch pack rotate freely relative to each other. When the clutches 420 are engaged, then the clutch packs rotate in unison. Thus, for example, the first clutch 420a, when engaged, will cause the first intermediate out shaft 510a to rotate with the output shaft 230. Otherwise the first intimidate output shaft 510a rotates freely relative to the output shaft 230. The second clutch 420b, when engaged, will cause the second intermediate output shaft 380 to rotate with the output shaft 230. Otherwise the second intimidate output shaft 380 rotates freely relative to the output shaft 230.

Figure 14:
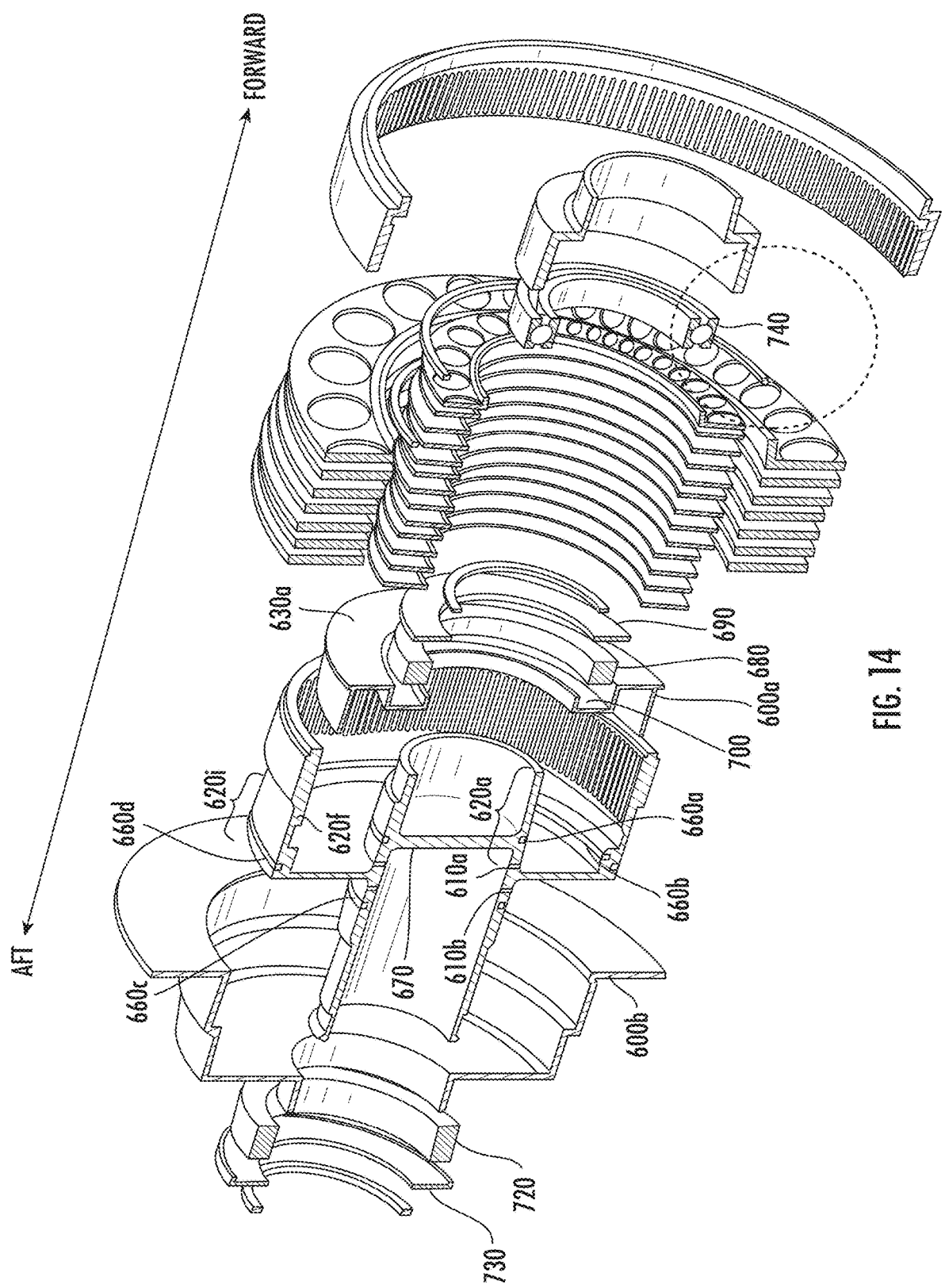
FIG. 14 illustrates additional features including seals and return springs associated with operation of pistons and clutches of a transmission according to an embodiment.

Turning to FIG. 14, a plurality of seals generally identified as 660 may be provided. The seals 600 may include a first seal 660a and a second seal 660b in the first piston housing 620a and engage the first piston 600a to keep fluid flowing from the first fluid port 610a from leaking around the first piston 600a. The first seal 660a may be an axially forward seal located between the first piston 600a and the first segment 620a of the output shaft 230. The second seal 660b may be an axially aft seal located between the first piston 600a and the third segment 620f of the output shaft 230.

A third seal 660c and a fourth seal 660d may engage the second piston 600b to keep fluid flowing from the second fluid port 610b from leaking found the second piston 600b. The third seal 660c may be an axially forward seal located between the second piston 600b and the output shaft 230. The fourth seal 660d may be an axially aft seal located between the second piston 600b and the third segment 620f of the output shaft 230. The output shaft 230 may include an internal annulus 670, disposed forward of the plurality of ports 610. The internal annulus 670 may be configured to seal fluid within the output shaft 230 from flowing forward thereof.

A first piston return spring 680 may be disposed axially between the first piston 600a and an annulus 690 fixed to the output shaft 230, wherein the annulus 690 may be axially forward of the first piston 600a. The first piston return spring 680 may bias the first piston 600a to disengage the first clutch 420a. The first piston 600a may include an axial channel 700 in the fourth member 630a for seating the first piston return spring 680 therein. The first piston return spring 680 may engage the annulus 690 for biasing the first piston 600b to disengage the first clutch 420a.

A second piston return spring 720 may be disposed axially between the second piston 600b and an annulus 730 fixed to the output shaft 230, wherein the annulus 730 may be positioned aft of the second piston 600b. The second piston return spring 720 may bias the second piston 600b to engage the second clutch 420b. In one embodiment, a rolling element bearing 740 may be disposed between the first intermediate output shaft 510a and output shaft 230.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transmission comprising:
   an input shaft configured to rotationally communicate with a gas turbine engine;
   an output shaft configured to rotationally communicate with an aircraft accessory; and
   a gear system connected between the input shaft and the output shaft, the gear system including:
   a first epicyclical gear set and a second epicyclical gear set that are axially adjacent to each other,
   wherein the first epicyclic gear set includes a first ring gear, a first sun gear, a first planetary gear set, and a first planetary carrier, and wherein the first planetary carrier is connected to the first planetary gear set,
   wherein the second gear set includes a second ring gear, a second sun gear, a second planetary gear set, and a second planetary carrier, and wherein the second planetary carrier is connected to the second planetary gear set, wherein the input shaft is rotationally fixed to the first ring gear and the second planetary carrier, and the second ring gear is rotationally fixed to the first planetary carrier;

a plurality of clutches that are axially aligned and radially offset, the plurality of clutches configured to engage in parallel the output shaft and shift the transmission via engaging the first epicyclical gear set and the second epicyclical gear set to generate a plurality gear speeds; and a plurality of pistons that are configured to engage the respective plurality of clutches, the plurality of pistons being hydraulically controlled and adapted to receive fluid from a respective plurality of ports in the output shaft.

2. The transmission of claim 1, wherein the plurality of pistons includes a first piston and a second piston and, wherein the plurality of ports in the output shaft include:
a first port fluidly communicating fluid to the first piston, the first piston engaging the first clutch of the plurality of clutches to rotationally couple the output shaft with the second sun gear; and
a second port fluidly communicating fluid to a second piston of the plurality of pistons, the second port being axially aft of the first port, the second piston engaging the second clutch of the plurality of clutches to rotationally couple the output shaft with the second ring gear and the first carrier.

3. The transmission of claim 2, wherein the output shaft includes:
a first output shaft segment that includes the plurality of fluid ports;
a second output shaft segment that extends radially from the first output shaft segment, the second output shaft segment being axially between the plurality of ports;
a third output shaft segment that extends axially from the second output shaft segment,
a first cavity is formed by the first output shaft segment, the second output shaft segment and third output shaft segment; and
a first piston housing is formed by an axial aft portion of the first cavity and a first clutch housing is formed by an axial forward portion of the first cavity.

4. The transmission of claim 3, wherein:
the transmission includes a first intermediate output shaft and a second intermediate output shaft, wherein the second intermediate output shaft is the second ring gear;
the first clutch is configured to engage the output shaft and the first intermediate output shaft; and
the second clutch is configured to engage the output shaft and the second intermediate output shaft.

5. The transmission of claim 4, wherein:
the first clutch housing includes a first spline that is a radially inner spline and a second spline that is a radial outer spline;
the first piston includes a third spline that is a radial outer spline configured to engage with the first spline;
the second piston includes a fourth spline that is a radial inner spline configured to engage with the second spline.

6. The transmission of claim 5, wherein:
the second intermediate output shaft includes a fifth spline that is a radially inner spline; and the second piston includes a sixth spline that is radially outer spline configured to engage with the fifth spline.

7. The transmission of claim 6, wherein:
the first intermediate output shaft has a seventh spline that is a radially outer spline; and
the first clutch includes:
an eighth spline that is a radially inner spline configured to engage with the seventh spline;
a ninth spline that is a radially outer spline configured to engage with the first spline;
wherein:
when the first clutch is engaged, the first intermediate output shaft and the output shaft are rotationally coupled; and
when the first clutch is not engaged, the first intermediate output shaft and the output shaft are rotationally decoupled.

8. The transmission of claim 7, wherein:
the second clutch includes:
a tenth spline that is a radially inner spline configured to engage with the second spline; and
an eleventh spline that is a radially outer spline configured to engage with the second intermediate output shaft;
wherein:
when the second clutch is engaged, the second intermediate output shaft and the output shaft are rotationally coupled; and
when the second clutch is not engaged, the second intermediate output shaft and the output shaft are rotationally decoupled.

9. The transmission of claim 8, wherein:
the first clutch comprises a first clutch pack comprising alternating clutch plates respectively comprising radially inner facing splines and radially outer facing splines; and
the second clutch comprises a second clutch pack having alternating clutch plates respectively comprising radially inner facing splines and radially outer facing splines.

10. The transmission of claim 9, wherein:
a first spring biases the first piston to disengage from the first clutch; and
a second spring biases the second piston to engage the second clutch.

11. The transmission of claim 10, wherein:
a first axially aft piston seal is disposed between the second output shaft segment and a first slider outer shaft; and
a first axially forward piston seal is disposed between the first output shaft segment and a first slider inner shaft;
a second axially aft piston seal is disposed between the first output shaft segment and a second slider inner shaft; and
a second axially forward piston seal is disposed between the second output shaft segment and a second slider outer shaft.

12. A method of transmitting rotational energy, comprising:
providing a transmission that includes
an input shaft,
an output shaft,
a gear system connected between the input shaft and the output shaft, the gear system including:
a first epicyclical gear set and a second epicyclical gear set that are axially adjacent to each other,
wherein the first epicyclic gear set includes a first ring gear, a first sun gear, a first planetary gear set, and a first planetary carrier, and wherein the first planetary carrier is connected to the first planetary gear set, wherein the second gear set includes a second ring gear, a second sun gear, a second planetary gear set, and a second planetary carrier, and wherein the second planetary carrier is connected to the second planetary gear set, wherein the input shaft is rotationally fixed to the first ring gear and the second planetary carrier, and the second ring gear is rotationally fixed to the first planetary carrier;

a plurality of pistons, a plurality of clutches, wherein the plurality of clutches are axially aligned and radially offset in the transmission;

providing a driving force to the input shaft of the transmission; and controlling hydraulic fluid within the output shaft of the transmission to engage the plurality of pistons, such that:

the plurality of pistons engage a respective one of the plurality of clutches; and whereby the clutches engage in parallel the output shaft and shift the transmission via engaging the first epicyclical gear set and the second epicyclical gear set to generate a plurality of rotational speeds.

13. The method of claim 12, including:

communicating fluid through a first port of the plurality of ports in the output shaft to a first piston of the plurality of pistons to engage and disengage with a first clutch, of the plurality of clutches, to respectively rotationally couple or decouple the output shaft with the second sun gear; and communicating fluid through a second port of the plurality of ports in the output shaft to a second piston of the plurality of pistons to engage and disengage with a second clutch of the plurality of clutches, to respectively rotationally couple or decouple the output shaft with the second ring gear and the first carrier.

14. The method of claim 13, including:

engaging the first output shaft and a first intermediate output shaft of the transmission through the first clutch; and engaging the first output shaft and a second intermediate output shaft of the transmission through the second clutch, wherein the second intermediate output shaft is the second ring gear.

15. The method of claim 14, comprising:

engaging a first spline in the output shaft with a third spline in the first piston; and engaging a second spline in the output shaft with a fourth spline in the second piston, thereby rotationally coupling the output shaft, the first piston and the second piston.

16. The method of claim 15, comprising:

engaging a fifth spline in the second intermediate output shaft with a sixth spline in the second piston, thereby rotationally coupling the second intermediate output shaft and the second piston.

17. The method of claim 16, comprising:

engaging a seventh spline in the first intermediate output shaft with an eighth spline in the first clutch; and engaging a ninth spline in the first clutch with the first spline;

whereby engaging the first clutch rotationally couples the first intermediate output shaft and the output shaft.

18. The method of claim 17, comprising:

engaging a tenth spline in the second clutch with the second spline; and engaging an eleventh spline in the second clutch with the second intermediate output shaft;

whereby engaging the second clutch rotationally couples the second intermediate output shaft and the output shaft.

19. The method of claim 18, comprising:

biasing the first piston with a first spring to normally disengage the first clutch; and biasing the second piston with a second spring to normally engage the second clutch.

20. The method of claim 19, comprising:

sealing fluid from flowing to the first piston from the first port with a first seal that is an axially forward seal located between the first piston and the output shaft and a second seal that is an axially aft seal located between the first piston and the output shaft; and sealing fluid from flowing to the second piston from the second port with a third seal that is an axially forward seal located between the second piston and the output shaft and a fourth seal that is an axially aft seal located between the second piston and the output shaft.

* * * * *